2,858,312
Patented Oct. 28, 1958

2,858,312
HYPOTENSIVE AGENTS

Stephen M. Olin, Elkhart, Ind., assignor to Miles Laboratories, Inc., Elkhart, Ind., a corporation of Indiana No Drawing. Application February 17, 1956
Serial No. 566,072

15 Claims. (Cl. 260—268)

This invention relates to compounds possessing important physiological activity as hypotensives and is a continuation-in-part of my earlier filed copending patent application Serial No. 462,123, filed Ocober 13, 1954, and since abandoned.

More particularly, the invention relates to 1,4-unsymmetrically substituted piperazines derivatives having the following empirical formula:

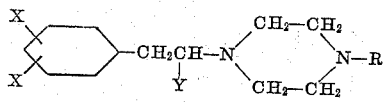

wherein R is selected from the group consisting of lower alkyl containing 4 to 8 carbon atoms, furfuryl and cyclohexyl, and X represents alkoxyl groups, or hydroxyl groups which may be attached to any two of the carbons on the phenyl ring, as for example at the 3,4 or 2,3 positions and Y represents a lower alkyl. In addition to the free bases of these compounds, the acid addition salts such as the sulfate, the hydrochloride or hydrobromide and like salts of these compounds are also within the specific contemplation of this invention.

That reaction found to be productive of good yields of the claimed compounds involves the interaction of the appropriate N,N-bis(2-haloalkyl) tertiary amine with the appropriate primary amine as represented in the following:

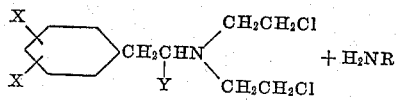

This reaction forming the piperazine portion of the final compound will be described in great detail after a review of the preliminary preparation of the tertiary amine reactant.

The preliminary preparation begins with the formation of the bis-hydroxyalkylamine represented by the following empirical formula:

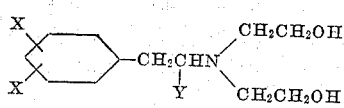

This compound is prepared in excellent yield by the addition of ethylene oxide to an aqueous suspension of the α alkylphenylethylamine. To this primary amine (1.0 mole) and 50 ml. of water at 50–60° C., ethylene oxide (2.2 moles) was passed in or added dropwise to the batch. At the end of the addition, the reaction mixture was distilled.

With the X substituent in the foregoing formula representing a methoxy substituent in the 3,4 positions and Y a methyl substituent, a 50% yield of a product having a boiling point of 170–173°/.15 mm. and $n^{23}D$ 1.540 was obtained. This compound has a theoretical nitrogen content of 4.93% and by electrometric titration with perchloric acid in dioxane a nitrogen content for the product of 4.94% was found.

On treatment with thionyl chloride, the hydroxyl groups in the two bis-hydroxyalkylamines are replaced by chlorine to give the N,N-bis(2-chloroalkyl) tertiary amines shown.

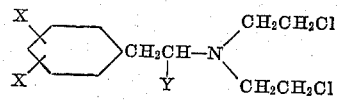

To a solution of the N,N-bis(2-hydroxyethyl) tertiary amine (1.0 moles) in 400 ml. of chloroform is added thionyl chloride (2.2 moles). The reaction mixture is refluxed until the evolution of gas abated and the mixture then concentrated under reduced pressure. The residual hydrochloride is then either recrystallized without further treatment or converted to the free base by cold concentrated sodium hydroxide and extracted with toluene or xylene. However, this "bis-chloro" compound was found to be more conveniently handled and stored as the hydrochloride salt.

With X representing methoxy substituents in the 3,4 positions and Y a methyl substituent in the above formula, a yield of 80% was obtained with the salt having a melting point of 146–148° employing isopropanol as the crystallizing solvent. Calculated chlorine content for the compound is 9.94% and that found by electrometric titration in water was 9.91%.

Returning to the final reaction first described, a mixture of the selected N,N-bis(2-chloroethyl) amine or its hydrochloride salt as prepared above is reacted with the selected primary amine to achieve the cyclization resulting in the piperazine ring. The reaction proceeds with or without solvent at temperatures in the range of 80 to 190°.

In line with the foregoing, the following examples provide a description of the specific operations performed under the general methods described.

EXAMPLE I

*1[2-(3,4-dimethoxyphenyl)-1-methylethyl]-4-furfurylpiperazine*

17.8 g. (0.05 mole) N,N-bis-(2-chloroethyl)-2-(3,4-dimethoxyphenyl)-1-methylethylamine hydrochloride and 19.4 g. (0.20 mole) furfurylamine were placed in a 100 ml. round-bottomed flask fitted with a reflux condenser, stirrer and thermometer. The reaction mixture was stirred and a spontaneous reaction began, upon which reaction the temperature rose to 120°. After the initial reaction was over and the temperature began to fall, external heat was applied to maintain the reaction mixture at 110–120° for thirty minutes. The reaction mixture was dissolved in 50 ml. of water and 50 ml. of ethyl acetate. The ethyl acetate layer was separated and the aqueous layer was extracted with a 25 ml. portion of ethyl acetate. The combined organic layers were dried and concentrated. The residue was distilled under reduced pressure. 10.5 g. of 1[2-(3,4-dimethoxyphenyl)-1-methylethyl]-4-furfuryl-piperazine (61% yield) as obtained by this reaction had a boiling point of 171–181° at 0.075 mm. and refractive index $n^{23}D$ 1.552.

The free base (10.5 g., 0.061 mole) in 100 ml. of ether was combined with an excess of etheral hydrogen chloride. The resulting precipitate was recrystallized from 50 ml. of methanol and 150 ml. of water. The yield obtained from this reaction was 10.3 g. having a melting point of 286–288°. The percent chlorine calculated for the dihydrochloride is 16.99 as compared to 16.74 found for the product.

EXAMPLE II

1-(2-methylpropyl)-4-[2-(3,4-dimethoxyphenyl)-1-methylethyl]piperazine 19.0 g. (0.26 mole) iso-butylamine and a toluene solution of N,N-bis-(2-chloroethyl)-2-(3,4-dimethoxyphenyl)-1-methylethylamine were placed in a 250 ml. round-bottomed flask fitted with a reflux condenser, stirrer and thermometer. The reaction mixture was heated under reflux for three hours, cooled and combined with sodium hydroxide (12.0 g., 0.3 mole) in 50 ml. of water. The toluene layer was separated, washed with water, dried and concentrated. The residue was distilled under reduced pressure. The result of this reaction was 23.6 g. 1-(2-methylpropyl)-4-[2-(3,4-dimethoxyphenyl)-1-methylethyl]piperazine (82% yield), having a boiling point of 145–151° at 0.12 mm. and refractive index $n^{23}_D$ 1.529. Upon redistillation 16.5 g. was yielded having a boiling point of 147–151° at 0.2 mm. and refractive index $n^{23}_D$ 1.527.

17.8 g. (0.056 mole) free base in 25 ml. methanol was added to a cold solution of hydrogen chloride (5.0 g., 0.13 mole) in 60 ml. ether. The resulting precipitate was washed with ether and dried. This resulted in a yield of 20.0 g. having a melting point of 286–287°. The percent chlorine calculated for the dihydrochloride is 18.03 as compared with 17.75 found for the product.

The following is illustrative of a very satisfactory method of introducing hydroxyl substituents on the phenyl moiety by dealkylation of alkoxy substituents.

EXAMPLE III

1-(2-methylpropyl)-4-[2-(3,4-dihydroxyphenyl)-1-methylethyl]-piperazine 15.0 g. (0.04 mole) 1-(2-methylpropyl)-4-[2-(3,4-dimethoxyphenyl)-1-methylethyl]-piperazine dihydrochloride and 100 ml. of redistilled 48% hydrobromic acid were placed in a 250 ml. round-bottomed flask fitted with a reflux condenser. The reaction mixture was heated to reflux and glacial acetic acid (10 ml.) was added to suppress foaming. The reaction mixture was refluxed for three hours. The acidic solvents were removed under reduced pressure and the residue was neutralized with 5% sodium carbonate to pH 9.0. The resulting suspension was extracted with three portions of ether (200 ml. total). The dried ethereal solution was combined with an excess of ethereal hydrogen chloride and the resulting precipitate was recrystallized from 100 ml. ethanol and 15 ml. water. The result of this reaction was a yield of 9.5 g. having a melting point of 299–301°. The percent chlorine calculated for the dihydrochloride is 19.41 as compared to 19.19 found for the product.

The following is illustrative of a very satisfactory method of preparing methoxy derivatives having the formula:

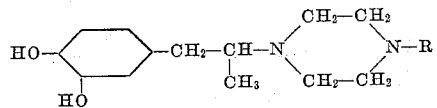

EXAMPLE IV 1 mole of the bis-chloroethylamine, 5 moles of the appropriate primary amine and 1 liter of xylene were placed in a three liter three-necked flask fitted with a thermometer, stirrer and reflux condenser and the reaction mixture heated under reflux for four hours. The reaction mixture was then cooled and 200 ml. of cold, aqueous sodium hydroxide (30%) was added thereto. The xylene layer was removed and dried. The xylene was removed by distillation and the residue dissolved in alcohol or ether and combined with ethereal hydrogen chloride. The resulting salt was recrystallized in an appropriate solvent until the correct analysis was obtained on oven dried material.

Compounds possessing said formula and produced by the above method included those wherein R was as indicated in the following table and which were crystallized in the solvent and had the melting point and chlorine analysis therein indicated:

TABLE A

| R | M. P. of Salt, degrees | Chlorine Analysis | | Crystallizing Solvent |
|---|---|---|---|---|
| | | Percent calculated | Percent found | |
| isoamyl | 271–272 | 17.41 | 17.25 | 95% ethanol. |
| N-hexyl | 270–271 | 16.75 | 16.70 | Isopropanol. |
| 2-heptyl | 266–268 | 16.28 | 16.24 | Ethanol-ethyl acetate. |
| 2-pentyl | 261–263 | 17.41 | 17.25 | Ethyl acetate. |
| 1,1,3,3-tetra-methyl-butyl | 250–252 | 15.78 | 15.64 | Methanol-ethyl acetate. |
| 1-methyl-2-(3,4-dimethoxyphenethyl) | 274–275 | 13.76 | 13.83 | Ethanol-acetone. |
| Isomer of above (higher melting free base) | 284–282 | 13.76 | 13.89 | Methanol-water. |
| 1,1-diethyl propyl | 260–262 | 15.91 | 15.62 | Methanol-ethyl acetate. |

The following is illustrative of a very satisfactory method of preparing hydroxy derivatives having the formula:

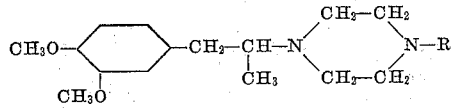

EXAMPLE V

In a one liter flask fitted with a reflux condenser were placed 0.1 mole of the methoxy derivative of Example IV and 150 ml. of hydrobromic acid (48%). The reaction mixture was heated to reflux. Sufficient glacial acetic acid (ca. 25 ml.) was added to reduce foaming and to dissolve the compound. Refluxing was then continued for two to five hours. After cooling, the cold reaction mixture was filtered to remove the product which was recrystallized from water-alcohol mixtures. Some of the resulting salts required four hours at 100° to remove water of crystallization.

Compounds produced by the above method include those wherein R was as indicated in the following table. They were crystallized in the solvent and had the melting point and analysis indicated in the table.

TABLE B

| R | M. P. of Salt, degrees | Bromine Analysis | | Crystallizing Solvent |
|---|---|---|---|---|
| | | Percent calculated | Percent found | |
| isoamyl | 268–269 | [1] 18.70 | [1] 18.70 | Methanol-ethyl acetate. |
| N-hexyl | 248–250 | 33.14 | 33.06 | Methanol-water ether. |
| 2-heptyl | 259–260 | 32.29 | 31.88 | Isopropanol-water. |
| 1-methyl-2-(3,4-dihydroxyphenethyl free base M. P. 198–201°) | 308–310 | 29.15 | 28.89 | Ethanol-water. |
| Isomer of above (free base M. P. 128–130°) | 308–310 | 29.15 | 29.13 | Do. |
| 3-pentyl | 277–278 | 34.13 | 33.82 | Water-methanol-acetone. |

[1] The free base was isolated and converted to a hydrochloride by a procedure analogous to Example III.

In addition to the above named compounds, the following have also been produced by the general methods outlined in said Examples IV and V: 1-[1-ethyl-2-(2,3-dimethoxyphenyl)ethyl]-4-methyl propyl piperazine which as the dihydrochloride salt melted at 252–254°. Its percent nitrogen calculated for $C_{20}H_{36}Cl_2N_2O_2$ was 6.88% as compared with 6.78% found for the product.

Demethylation of the corresponding methyl analog of the above compound was accomplished by the procedure of Example V and gave the partially demethylated compound 1-[2-(2-hydroxy 3-methoxyphenyl)-1-methyl ethyl] propyl piperazine which as the dehydrochloride salt melted at 270–272°. Its percent carbon calculated for $$C_{18}H_{32}Cl_2N_2O_2$$

was 56.96% while that found was 56.73%. More stringent treatment gave the fully methylated product 1-[2-(2,3-hydroxylphenyl)-1-methyl ethyl]-4-methyl propyl piperazine and which as the dihydrobromide monohydrate salt melted at 281–282°. 33.93% bromine was found as compared to a 33.80% bromine content calculated for $C_{17}H_{30}Br_2N_2O_2H_2O$.

Other compounds produced were 1-[2-(3,4-methoxy phenyl)-1-ethyl ethyl]-4-methyl propyl piperazine which as the dihydrochloride salt melted at 265–266° and 1-[2-(3,4-dimethoxyphenyl)-1-methyl ethyl] - 4 - (3 - hydroxyphenyl) piperazine which also as the dihydrochloride salt melted at 244–246°. Also produced by said method of Example V was 1 - [2 - (3,4 - dihydroxyphenyl) - 1 - ethyl ethyl]-4 methyl butyl piperazine which as the dihydromide monohydrate salt melted at 240–242° and was soluble in water and alcohol. Calculated for $C_{18}H_{32}Br_2N_2O_2H_2O$ its Br content would be 32.86%, its N 5.76% which compared with that found Br 32.41% and N 5.81%.

Ordinarily it was found convenient to isolate the methoxy compounds as hydrochlorides and the hydroxy compounds as hydrobromides.

These compounds in either the free base forms or as the salts can be conveniently employed in combination with the well-known pharmaceutical excipients such as elixirs or conventional tabletting compositions, for example.

The salts of the free bases are obtainable in the form of various acid addition salts such as exemplified by the dihydrochlorides, dihydrobromide monohydrates, and the sulfates. The most satisfactory yields of the dihydrochloride, without undue development of the monohydrochloride, were obtained by adding a slight excess of a solution of anhydrous hydrogen chloride to a solution of the free base in solvent which would allow the salt to crystallize slowly and completely. Similarly, there is a problem arising from the hemisulfates in the preparation of the sulfates. However, the hemisulfates were intentionally prepared in an effort to produce a salt less acidic than the aqueous solutions of the sulfates and dihydrochlorides which exhibited a pH of 1 to 3. The hemisulfates in solution had a pH of from 3 to 3.5 which solutions could be adjusted to a slightly higher pH before the free base began to precipitate.

What is claimed is:

1. A member of the group consisting of compounds having the formula:

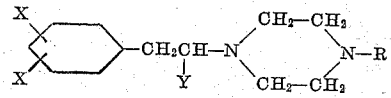

and acid addition salts thereof wherein R is selected from the group consisting of lower alkyl containing 4 to 8 carbon atoms, 1-lower alkyl-2-[3,4-di-(lower alkoxy)] phenethyl, 1-lower alkyl-2-(3,4-dihydroxy) phenethyl, furfuryl and cyclohexyl, X is selected from the group consisting of lower alkoxy and hydroxy, and Y is lower alkyl.

2. 1-(2-methylpropyl)-4-[2-(3,4 - dimethoxyphenyl)-1-methylethyl] piperazine.

3. 1-[2-(3,4-dimethoxyphenyl)-1-methylethyl] - 4 - furfuryl piperazine.

4. 1-(2-methylpropyl)-4-[2-(3,4 - dihydroxyphenyl)-1-methyl ethyl] piperazine.

5. 1-[1-ethyl-2-(2,3-dimethoxyphenyl)ethyl] - 4 - methylpropyl piperazine.

6. 1-[1-ethyl-2-(3,4-dimethoxyphenyl)ethyl]-4-methylpropyl piperazine.

7. A piperazine compound having the formula

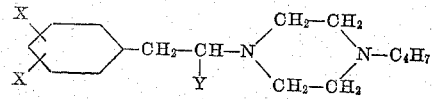

wherein each X represents a hydroxy group and Y is a lower alkyl.

8. A piperazine compound having the formula

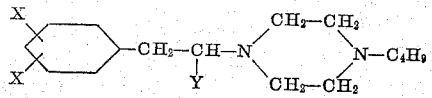

wherein each X represents a lower alkoxy group and Y is a lower alkyl.

9. A piperazine compound having the formula

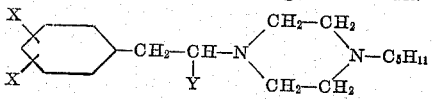

wherein each X represents a hydroxy group and Y is a lower alkyl.

10. A piperazine compound having the formula

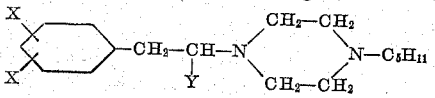

wherein each X represents a lower alkoxy group and Y is a lower alkyl.

11. A piperazine compound having the formula

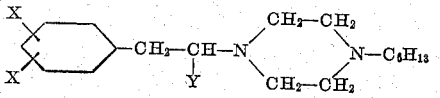

wherein each X represents a hydroxy group and Y is a lower alkyl.

12. A piperazine compound having the formula

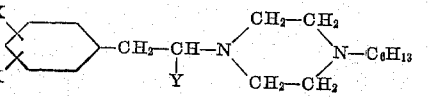

wherein each X represents a lower alkoxy group and Y is a lower alkyl.

13. A piperazine compound having the formula

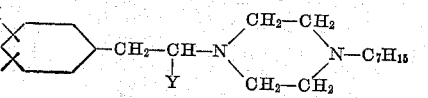

wherein each X represents a lower hydroxy group and Y is a lower alkyl.

14. A piperazine compound having the formula

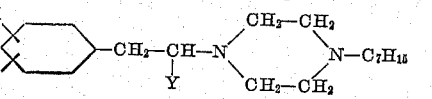

wherein each X represents a lower alkoxy group and Y is a lower alkyl.

15. A piperazine compound having the formula

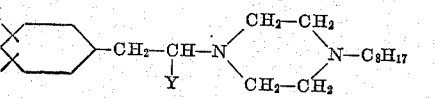

wherein each X represents a lower alkoxy group and Y is a lower alkyl.

References Cited in the file of this patent

UNITED STATES PATENTS 2,415,785   Buck et al. _____ Feb. 11, 1947

OTHER REFERENCES

Chemical Abstracts, vol. 46, page 8661c (1952).

UNITED STATES PATENT OFFICE
CERTIFICATE OF CORRECTION

Patent No. 2,858,312                                             October 28, 1958

Stephen M. Olin

It is hereby certified that error appears in the printed specification of the above numbered patent requiring correction and that the said Letters Patent should read as corrected below.

Column 6, lines 4 to 7, extreme right-hand portion of the formula, for "$\rangle N-C_4H_7$" read -- $\rangle N-C_4H_9$ --.

Signed and sealed this 10th day of February 1959.

(SEAL)

Attest:

KARL H. AXLINE
Attesting Officer

ROBERT C. WATSON
Commissioner of Patents